Sept. 27, 1938. L. MOSMIERI ET AL 2,131,406
DEVICE FOR TEMPERING SHEETS OF GLASS, OF STEEL, AND OTHER MATERIAL, BY AIR
Original Filed July 30, 1932   2 Sheets-Sheet 1

Leonardo Mosmieri
Gino Dal Pino
INVENTORS their ATTY.

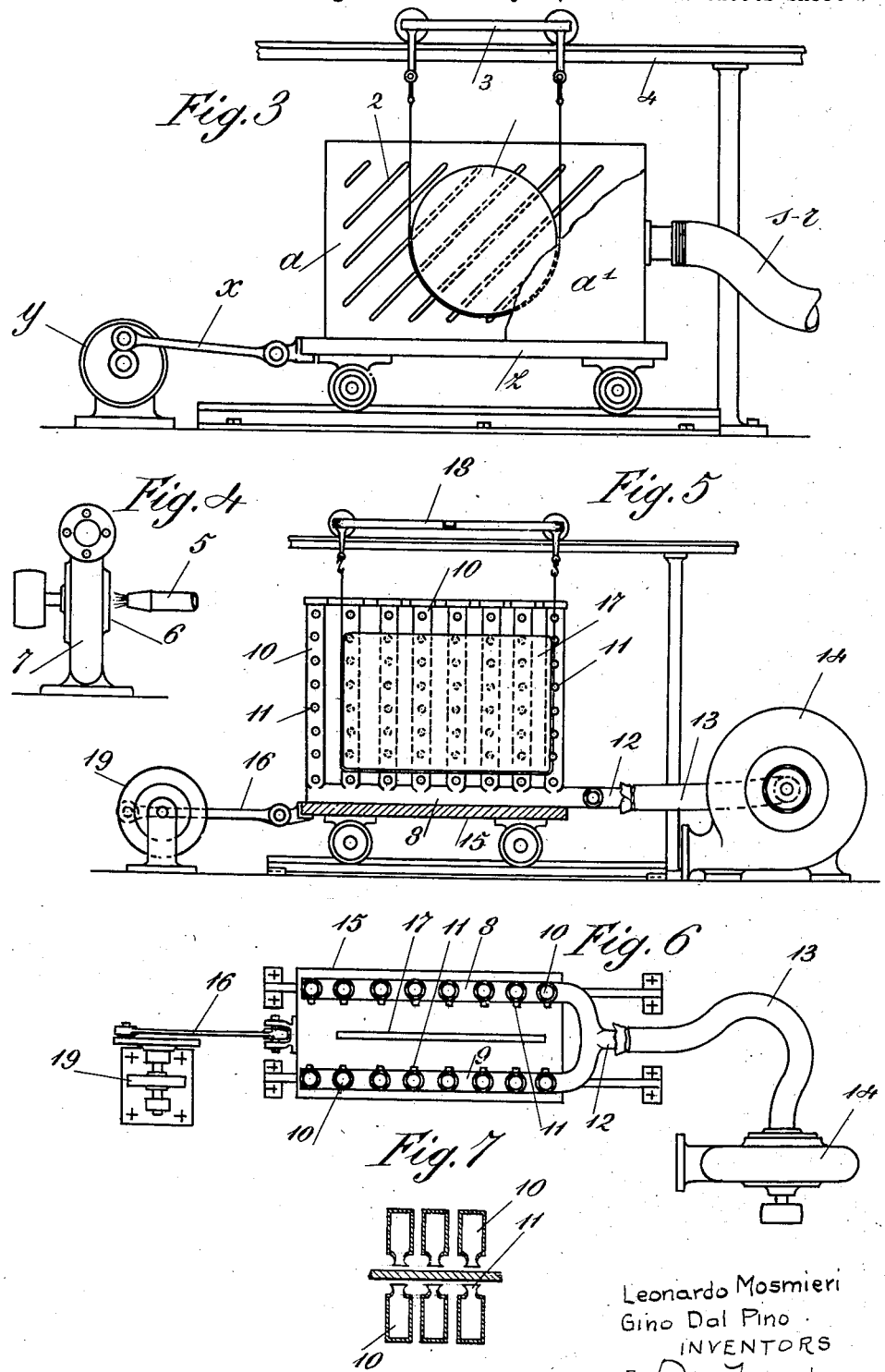

Patented Sept. 27, 1938

2,131,406

UNITED STATES PATENT OFFICE 2,131,406

DEVICE FOR TEMPERING SHEETS OF GLASS, OF STEEL, AND OTHER MATERIAL, BY AIR

Leonardo Mosmieri and Gino Dal Pino, Florence, Italy, assignors, by mesne assignments, to The American Securit Company, a corporation of Delaware Application July 30, 1932, Serial No. 627,040. Renewed July 18, 1938. In Italy August 7, 1931

16 Claims. (Cl. 49—45)

This invention relates to improvements in the method of and apparatus for tempering glass and/or sheets of other material such as steel by means of air.

In order to control the cooling and thus the tempering of glass and steel sheets, it has been proposed to use an oil bath heated to 300° C. into which are dipped the objects heated to the critical point of pasty consistency, i. e., to the temperature whereat glass though not undergoing any appreciable deformations under the forces generated by its own weight, is deformable under the action of considerable forces.

Water vapor has also been used for this purpose. It is also known that tempering may be obtained by a jet of air directed against the object to be tempered.

It has been proposed to employ two storage chambers for the collection of air projected by a "Pneuphore" machine, said chambers being perforated and orifices turned towards the two faces of the sheet to be tempered.

The air thus projected absorbs considerable heat, giving rise to those phenomena of molecular adjustment that characterize the tempering of glass.

The sheets of glass thus tempered exhibit symmetrical irregularities corresponding to the position of the apertures through which the air has been projected.

These irregularities of tension are readily observable through the tension-meter and may attain 0.8 of a degree according to the Mosmieri scale.

These parasitical irregularities or anisotrophies migrate from the repartition of the characteristic tensions and cause marked irisations observable on the sheets when viewed under certain conditions of light.

The subject of the present invention is a system of tempering whereby it is possible to obtain regular and uniform absorption of heat on both faces of the sheet to be tempered. The tempered sheet will have uniform and appropriate anisotrophies free from irregularities and hence of irisations.

According to the invention, air or air and steam are blown or drawn, depending on the thickness of the glass, through two collectors or chambers arranged one on either side of the sheet of glass to be tempered. From the collectors the air issues, or enters, through a series of circular orifices or slots facing each other. The sheet is located between the orifices and is heated to the desired degree. The sheet, or the two collectors, or both, move in such a manner that a uniform distribution is obtained during the thermic absorption.

Depending on the thickness of the sheet the speed of the device must necessarily be greater or smaller and the thermic absorption more or less violent. For this reason, when there are thin sheets to be tempered, the device must be so adjusted as to enable the injection of either air or steam. This will allow the limiting of the movement of the cooling device and it will not be necessary to increase it to any considerable speed in the case of thin sheets. When sheets of considerable thickness are to be tempered, air must be drawn in through the slots of the collectors.

The invention will be more clearly understood from the drawings and the following description which, merely by way of example, schematically show some forms of mechanical embodiment of the invention.

In the drawings, Fig. 1 shows the apparatus in a front view, in which the chambers or collectors move in a rotary direction and the sheet of glass, or other material, moves in a translational direction;

Fig. 3 shows in a front view a third example wherein the collectors are located on a carriage which moves to and fro, while the sheet is suspended from a carriage slidable on longitudinal rails leading to the heating furnace;

Fig. 4 shows how steam may be injected into the suction mouth of the ventilator or blower;

Fig. 5 shows in vertical section; and

Fig. 6 is a plan view of a form of apparatus for tempering by air-suction;

Fig. 7 shows in a plan view a different type of collector provided with nozzles.

Figure 1:
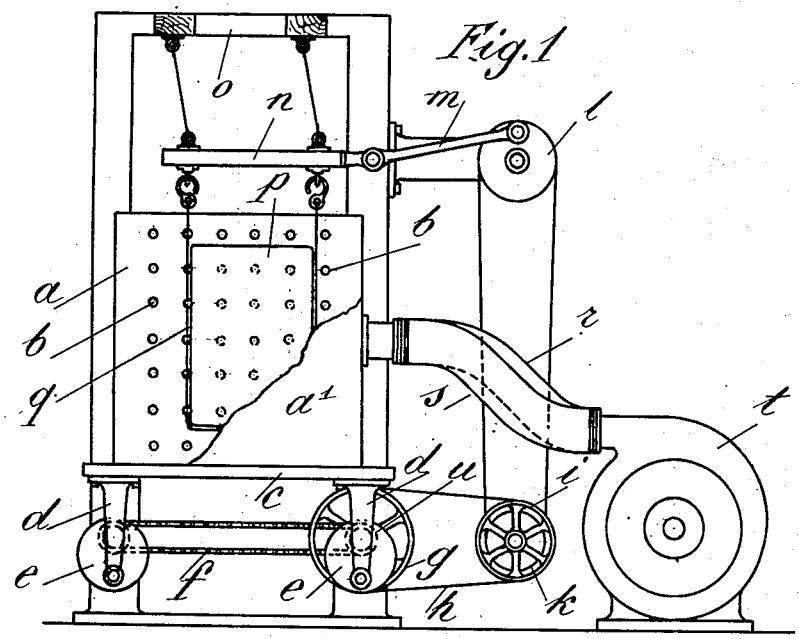

According to the example shown in Fig. 1, the device is composed of two collectors $a$, $a^1$ of air enclosed within two walls facing each other, each of which has a large number of apertures $b$ which may also be shaped like conical nozzles. These two collectors $a$, $a^1$ are located on a plane $c$ which carries link supports $d$ pivoted in eccentrics $e$. These eccentrics are connected together by gearing and chain pulleys $f$. A pulley $g$, by means of the transmission $h$ and of other pulleys $i$, $k$, transmits the motion to an eccentric $l$ which, through the medium of the link $m$, imparts the motion to a support $n$ suspended from the general framework $o$.

From this support $m$ is suspended the sheet $p$ by means of a very thin band $q$ made, for instance, of non-oxidizable steel.

The two capacities $a$, $a^1$, are joined by two flexible tubes or pipes $r$, $s$, which verge in a ventilator or blower $t$. By means of any suitable transmission, motion is imparted to the axle $u$ which transmits the motion to the whole of the device and thence to the eccentrics $e$ which are connected together. These eccentrics impart a rotary motion to the plane $c$ and consequently to the two collectors $a$, $a^1$, whereas the link $m$ shifts the support $n$ to and fro, to which support is hooked the sheet $p$. The blower injects air which on escaping from the nozzles $b$, bathes the sheet $p$ on either side uniformly.

Figure 2:
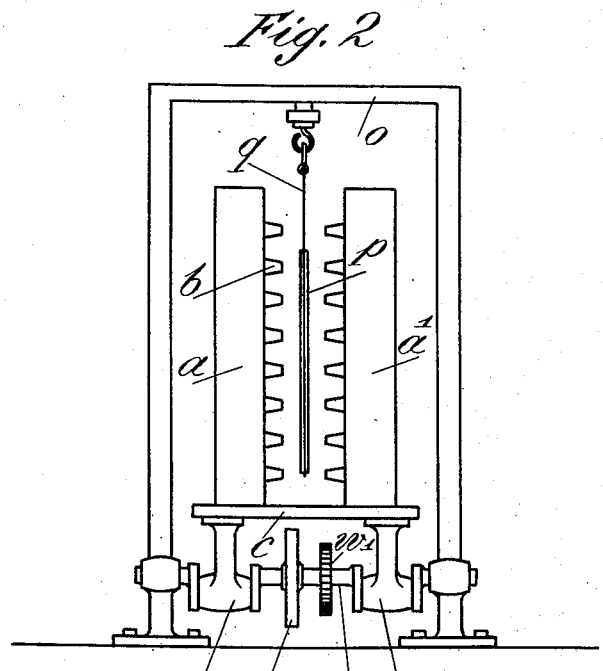
Fig. 2 shows in a side view a device in which the collectors move in a rotary direction while the sheet is fast.

In Fig. 2 the sheet to be tempered $p$ is suspended by means of the band $q$ from the framework $o$, while the two collectors $a$, $a^1$ are located on the plane $c$ carried by supports $v$ which play in a crank axle $w$.

The toothed pulley $w^1$ moves through the chain $f$ the corresponding opposite crank axle, while the pulley $w^2$ receives and transmits the motion.

In this case, likewise, the two collectors $a$, $a^1$ are in communication with the blower $t$ by means of the two flexible ducts $s$, $r$.

The crank axles $w$ transmit a slight rotary motion to the two collectors $a$, $a^1$ which may be provided with conical nozzles $b$.

In the example according to Fig. 3, a link $x$ imparts through the medium of the eccentric $y$ a reciprocating motion to a carriage $z$ upon which are located the two collectors $a$, $a^1$. These collectors may be provided with conical nozzles or with conical slots 2. The sheet $p$ suspended from a carriage 3 is slidable along a rail 4 leading to the furnace. The two collectors are always connected with the blower $t$ by means of flexible ducts.

Three examples of execution have been shown, but it is evident that any other device involving a more or less complicated displacement of the two collectors $a$, $a^1$, or of the sheet of glass or other material, may serve for the purpose of rendering uniform and constant the sum of the quantities of air which bathe during tempering every point of the surface on both sides of the sheet of glass, steel, or other material to be tempered.

The center of maximum pressure and hence of maximum delivery of air is along the generatrix of the conical nozzles, or along the planes passing through the vertex of the slots, if conical. If these zones of maximum pressure migrate as far as the surface of the sheets to be tempered in such a manner as to maintain unvaried, as far as possible, their speed of migration, it is obvious that the whole surface will be subjected to uniform absorption of heat with consequent uniformity in the distribution of the tensions. This is demonstrated by the tension-meter in the case of glass, and by the resultant planimetry in the case of sheets of steel.

An application of the invention is shown in Fig. 4 which is especially suited to thin sheets over which the distribution of the cooling must be effected within a very short space of time, and where it is, therefore, necessary for the movement of the mechanism to attain speeds that shall not impair the balance of the system. Thus assisted, the motion may be rendered more moderate as the absorptive capacity of the fluid is suitably increased by a jet of superheated aqueous vapor introduced into the suction mouth of the blower, which conveys air into the collectors. By regulating this jet of vapor, the speed of the cooling may be varied until the best result is obtained.

In Fig. 4 a jet of super-heated steam is injected through the pipe or nozzle 5 into the suction mouth 6 of the blower 7. Thus the fluid which is projected by the blower against the sheets to be tempered has more or less heat-absorbing capacity, depending on the extent of the steam injection into the blower.

Instead of the jets of air impinging upon the sheet to be tempered, an air-suction effect may be produced by the nozzles or the slots as already indicated.

In this case the air-collecting pipe is connected to the suction mouth of an aspirator, but it is the surrounding air which is drawn in through the nozzles or the slots, so that it circulates and bathes the sheet on its way, and withdraws heat with greater uniformity than occurs when air is projected from the nozzles against the moving sheet. The reason for this is that cold air impinges at an almost constant speed when coming from the atmosphere wherein the sheet undergoing tempering is immersed. This improvement proves most effective for sheets of considerable thickness for the tempering of which the mechanism may be shifted with relatively slow movements.

Figs. 5 and 6 show an example of the way in which the system may be arranged to suck in the surrounding air through mouths in motion and in which the moving sheets are immersed.

Two collectors 8, 9, facing each other, comprise a number of vertical pipes or tubes or the like 10, 10. A certain number of nozzles 11, 11 are in each pipe, the nozzles being so located that those belonging to one row of pipes face those of the opposite row.

The two collectors 8, 9, are likewise tubular and form collectors for each row of pipes. These collecting supports 8, 9, in turn unite into a single pipe 12 to which is connected a flexible duct 13 leading to an aspirator 14. These collectors 8, 9, 10, 11, 12, are located upon a carriage 15 which is shifted by means of the link 16 actuated by a suitable motor. The carriage runs upon special rails.

The sheet to be tempered 17, is placed between the two series of pipes that face each other and is supported by a shiftable carriage 18.

The pipes 10 may be of any other cross section than a circle such, for instance, as that shown in Fig. 7. The latter shows collectors the cross section of which forms a parallelepiped which expanded nozzles 11.

The pulley 19 imparts motion to the link 16 which insures an alternating reciprocating motion of the carriage 15.

The pulley 20 actuates the aspirator 14 which will bring about an aspiration within the pipes 8, 9, 10, and as a consequence, the aspiration of the surrounding air through the nozzles 11. Thus a continuous current of air at a maximum temperature will be created in front of the nozzles or slots 11, heat being absorbed by the surrounding air from the sheet of glass located in front of the pipes. Owing to the continuous and regular displacement of the two collectors as well as of the sheet, there will be a continual change of position of the zones of aspiration, the average absorption being thus rendered very regular relatively to the surface.

Having now particularly described and ascertained the nature of our said invention and in what manner the same is to be performed, we declare that what we claim is:

1. A device for tempering sheets of glass, steel and the like, comprising a carriage, means for displacing said carriage, two sets of air circulating means supported by said carriage, and movable sheet supporting means associated with said carriage; further actuating means for said carriage displacing means and the sheet supporting means to produce relative movement between the said carriage and the sheets.

2. A device as claimed in claim 1, in which said means for displacing said carriage comprise cam wheels, and the said air circulating means comprise a plurality of nozzles disposed at opposite sides of said sheet supporting means to cover an area greater than that of a sheet, and which comprises a blower disposed outside said carriage and flexibly connected with said circulating means.

3. A device as claimed in claim 1, in which said means for displacing said carriage comprise cam wheels, and a support carried thereby for the said carriage.

4. A device as claimed in claim 1, in which said means for displacing said carriage comprise cam wheels disposed outside of said carriage.

5. A device as claimed in claim 1, in combination with steam injecting means associated with said circulating means.

6. A device, as claimed in claim 1, in which the movable sheet supporting means comprises a thin band of un-oxydizable steel in which the sheet is supported.

7. In a device for tempering sheets of glass, steel and the like, an arrangement of relatively fixed air injector nozzles, and eccentric means associated with said arrangement of nozzles to move the latter in a direction parallel to the sheet being tempered, whereby the direction of air blasts from the nozzles remains constant with respect to the sheet and the position of the said nozzles varies relatively to the surface of the sheet.

8. In a device for case hardening glass sheets, means for supporting a glass sheet in a vertical plane, a series of nozzles fixed in respect to each other and spaced from the plane of support of the glass sheet, mounting means for the nozzles, eccentric means for moving said mounting means in a direction to cause said nozzles to describe similar closed paths, and means for supplying a fluid under pressure through the mounting means and to said nozzles.

9. In a device for case hardening glass sheets, means for supporting a glass sheet in a vertical plane, a series of nozzles fixed in respect to each other and spaced from the plane of support of the glass sheet, mounting means for the nozzles, means for moving said mounting means in a direction to cause said nozzles to describe similar closed paths, and means for supplying a fluid under pressure through the mounting means and to said nozzles.

10. In a device for case hardening glass sheets, means for supporting a glass sheet in a vertical plane, a series of nozzles fixed in respect to each other and spaced from the plane of support of the glass sheet, mounting means for the nozzles, means for moving said mounting means in a direction to cause said nozzles to describe similar circular paths, and means for supplying a fluid under pressure through the mounting means and to said nozzles.

11. In a device for case hardening glass sheets, means for supporting a glass sheet in a vertical plane, a series of nozzles fixed in respect to each other and spaced from the plane of support of the glass sheet, mounting means for the nozzles, means for supplying a fluid under pressure through the mounting means and to said nozzles, and means for producing a relative movement between the said mounting means and the supporting means for the sheet to cause the blast from said nozzles to describe similar closed paths on the glass sheet.

12. In a device for case hardening glass sheets, means for supporting a glass sheet in a vertical plane, slotted injecting means spaced from the plane of support of the glass sheet, means for moving said slotted injecting means in a direction to cause said slotted injecting means to describe similar closed paths, and means for supplying a fluid under pressure to the said slotted injecting means.

13. In a device for case hardening glass sheets, means for supporting a glass sheet in a vertical plane, slotted injecting means spaced from the plane of support of the glass sheet, means for moving said slotted injecting means in a direction to cause said slotted injecting means to describe similar circular paths, and means for supplying a fluid under pressure to the said slotted injecting means.

14. In a device for case hardening glass sheets, means for supporting a glass sheet in a vertical plane, slotted injecting means spaced from the plane of support of the glass sheet, means for supplying a fluid under pressure to the said slotted injecting means, and means for producing a relative movement between the said slotted injecting means and the supporting means for the sheet to cause the blast from said slotted injecting means to describe similar closed paths on the glass sheet.

15. In a device for case-hardening glass sheets, means for supporting a glass sheet in a vertical plane, a series of nozzles fixed in respect to each other and spaced from the plane of support of the glass sheet, mounting means for the nozzles, eccentric means for imparting relative movement between the mounting means and the supporting means for the sheet to cause the blast from said nozzles to describe similar closed paths, and means for supplying a fluid under pressure through the mounting means and to said nozzles.

16. In a device for tempering sheets of glass, steel and the like, supporting means for a sheet, movable air circulating means disposed at opposite sides of said supporting means to accommodate a sheet therebetween and provided with a plurality of slots disposed to cover the entire height of the sheet, said air circulating means being movable relatively with respect to said supporting means.

LEONARDO MOSMIERI.
GINO DAL PINO.